United States Patent [19] [11] 4,185,919
Williamson et al. [45] Jan. 29, 1980

[54] QUADRANT DETECTION SYSTEM

[75] Inventors: Tommy L. Williamson, Kettering; Harold W. Rose, Xenia, both of Ohio

[73] Assignee: The United States of America as represented by the Secretary of the Air Force, Washington, D.C.

[21] Appl. No.: 369,030

[22] Filed: Jun. 8, 1973

[51] Int. Cl.² .................. G01B 11/26; G02B 5/18
[52] U.S. Cl. .................. 356/141; 350/3.72; 350/162 ZP; 356/152
[58] Field of Search .............. 356/141, 152; 350/3.5, 350/162 ZP, 3.72

[56] References Cited
U.S. PATENT DOCUMENTS 3,375,750   4/1968   Ellis et al. .............................. 356/152
3,701,602  10/1972   Bergin et al. ........................... 356/152

OTHER PUBLICATIONS

Sincerbox, IBM Tech. Discl. Bulletin, 8-1967, pp. 267, 268.

Primary Examiner—S. C. Buczinski
Attorney, Agent, or Firm—Joseph E. Rusz; Richard J. Killoren

[57] ABSTRACT

A quadrant detection system having an objective lens and a holographic lens positioned at the back focal plane of the objective lens. Four photoelectric detectors are positioned on the side of the holographic lens remote from the objective lens. The holographic lens has lens elements in four quadrants with each quadrant having a focal point corresponding to the position of the photoelectric detectors.

2 Claims, 5 Drawing Figures

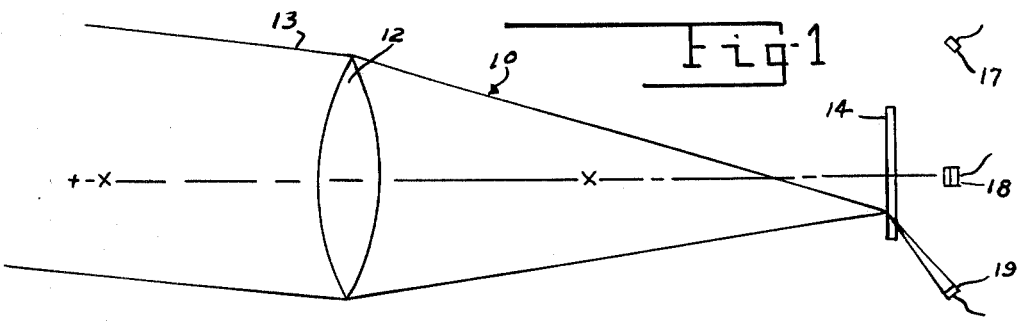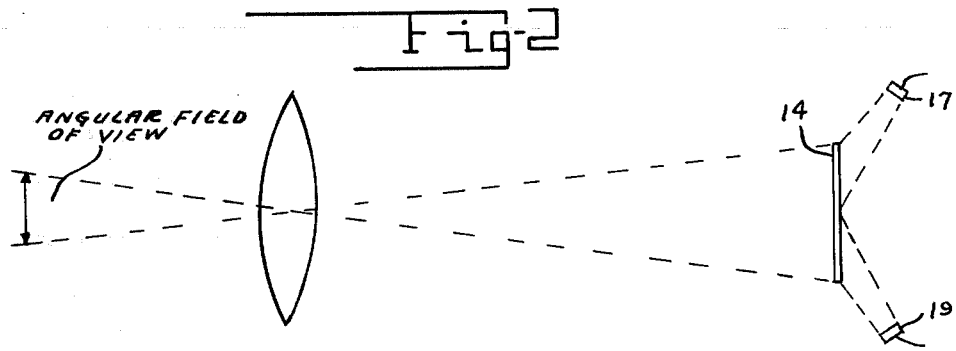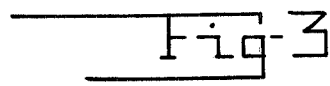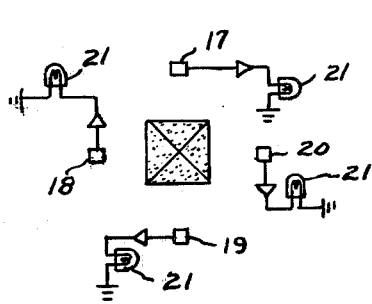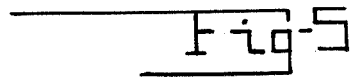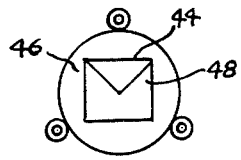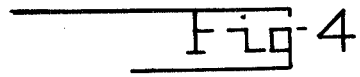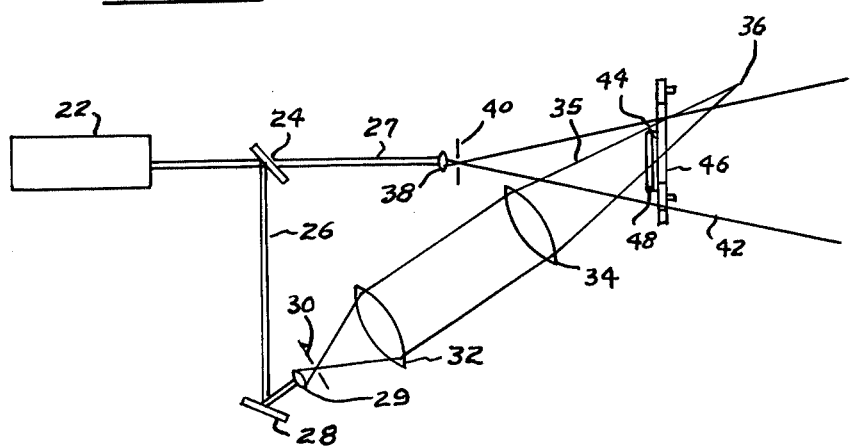

QUADRANT DETECTION SYSTEM

BACKGROUND OF THE INVENTION

In the prior art quadrant detectors, the use of area detectors, suffered from the fact that large area photoelectric detectors have very poor sensitivities, high capacitance, slow response and poor signal to noise ratios. Also, area detectors are available for only a limited range of wave lengths. In prior art quadrant detectors, the angular field of view is limited by the size of the detector. Thus, to obtain a large angular field of view, the use of costly large area detectors is required.

Presently in the state of the art, there are available high quality point detectors, which do not have the limitations of area detectors. Due to their small area, however, no quadrant detector system is presently available to make use of these point detectors.

BRIEF SUMMARY OF THE INVENTION

According to this invention, quadrant holographic lens elements are used together with point photoelectric detectors in place of the large area detectors. With the use of the quadrant holographic lens elements, the light falling in one quadrant will be imaged upon the point detectors. The position to where the light is imaged is independent of the actual portion of the quadrant of the holographic lens elements, illuminated. Also, the angular field of view of the detector is limited only by the hologram size and is independent of the size of the detectors.

IN THE DRAWING

FIG. 1 is a schematic view of a quadrant detector according to the invention.

FIG. 2 is a diagram showing the angular field of view for the device of FIG. 1.

FIG. 3 is a schematic diagram of the holographic lens and detector arrangement for the device of FIG. 1.

FIG. 4 shows an apparatus for producing the holographic lens of FIGS. 1 and 3.

FIG. 5 is a plan view of masking system for the device of FIG. 4.

DETAILED DESCRIPTION OF THE INVENTION

Reference is now made to FIG. 1 of the drawing which shows a quadrant detector system 10 having an objective lens 12 which collects light from distant illuminating sources, not shown, such that the incoming wavefront is essentially collimated as shown at 13. The incoming light is focused at the back focal plane of lens 12. A quadrant holographic lens 14 is positioned approximately at the back focal plane of lens 12. The lens 14 is constructed as explained below. The illumination from the distant source appears on the holographic lens as an illuminated point. The holographic lens will then image the incoming radiation to a unique position for each quadrant dependent only upon the geometry of the holographic lens construction. Detector 17, 18, 19 and 20 are positioned at the focal plane for each of the quadrants so that each detector is illuminated whenever incoming light falls within the corresponding quadrant of the holographic lens as shown in FIG. 2 for two quadrants. The other two quadrants would be the same except rotated 90 degrees. The angular field of view of the detector is limited only by the size of the holographic lens, as shown in FIG. 2. The detectors 17, 18, 19 and 20 are conventional detectors such as Texas Instrument, TIXL69 or EGG, YAG 444.

The detectors 17, 18, 19 and 20 may be connected to conventional indicating lamps 21 or may be connected in known types of difference to sum ratio circuits, not shown. The holographic lens is constructed in the manner shown in FIGS. 4 and 5. The system for producing the holographic lens is similar to that described in patent to Leith, U.S. Pat. No. 3,586,412.

Light from a coherent source 22, such as a laser, is split by beam splitter 24 which divides the light between beams 26 and 27. The light beam 26 is reflected by mirror 28 through lens 29. A pin hole filter 30 is placed at the point of lens 29 to provide a diverging beam for collimating lens 32. The light from collimating lens 32 is directed to a converging lens 34 which provides a beam 35 which converges to point 36. The beam 27 is directed to a lens 38. The light from lens 38 is directed through a pin hole filter 40 placed at the focal point of lens 38. This provides a diverging beam 42. A holographic plate 44 is mounted on a rotatable support 46 and is positioned in the beams 35 and 42. A mask 48 which permits only one quadrant of the holographic plate to be illuminated at a time is positioned in front of plate 44, as shown in FIG. 4. As each quadrant is exposed, the support 46 is rotated 90 degrees and another quadrant of the holographic plate is exposed. When all four quadrants have been exposed, the holographic plate is removed from the support and developed in a conventional manner.

While the device has been described as a quadrant detector, a number of detectors, different from four, could be used, for example, systems having two, three, six or any other desired number could be provided.

Also, the holographic lens could be produced in other ways than that shown, such as, with the use of a computer to produce the density pattern.

There is thus provided a quadrant detector wherein a holographic lens and four point detectors are provided in place of the normal quadrant area detectors.

We claim:

1. A detection system for providing directional information concerning illumination reaching the detecting system from a distant source, comprising: an objective lens adapted to receive illumination; a holographic lens positioned approximately at the back focal plane of said objective lens, a plurality of photoelectric point detectors positioned around the periphery of the holographic lens and spaced therefrom on the side remote from said objective lens; said holographic lens including a plurality of means for imaging light from the objective lens, falling on each imaging means, onto predetermined corresponding ones of said photoelectric detectors.

2. The device as recited in claim 1 wherein said holographic lens has holographic lens elements positioned in four equal quadrants and wherein each holographic lens element is adapted to image light falling in a quadrant onto a corresponding photoelectric detector positioned adjacent that quadrant.

* * * * *